March 22, 1966   G. JUILLARD ETAL   3,241,306
REGULATING ARRANGEMENT FOR HOROLOGICAL MOVEMENT
Filed April 16, 1964
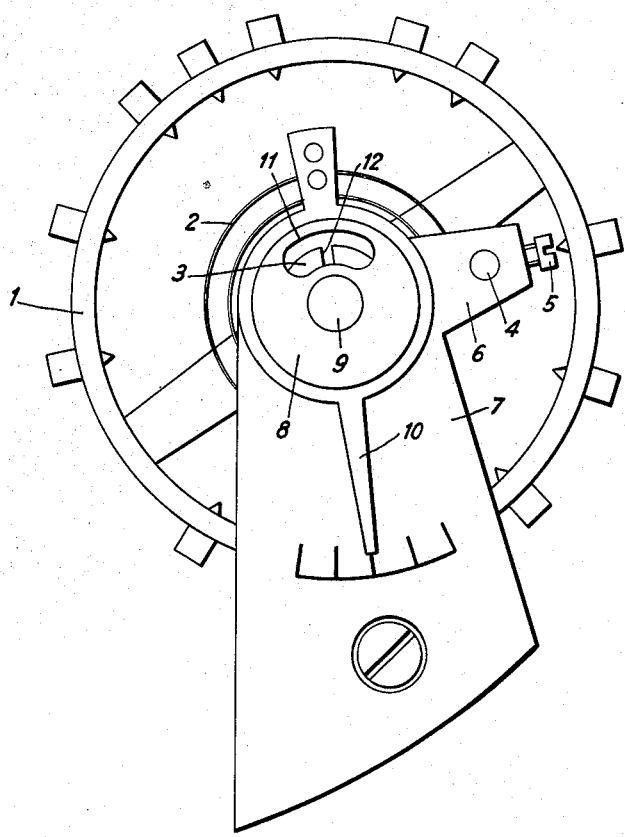
INVENTORS:
GEORGES JUILLARD &
MAURICE DÉBOEUF
By Raymond W. Cotten
ATTORNEY

United States Patent Office 3,241,306
Patented Mar. 22, 1966

3,241,306
REGULATING ARRANGEMENT FOR
HOROLOGICAL MOVEMENT
Georges Juillard, Rue des Tilleuls 4, Porrentruy, Switzerland, and Maurice Déboeuf, Courgenay, Switzerland
Filed Apr. 16, 1964, Ser. No. 360,282
3 Claims. (Cl. 58—109)

Our present invention relates to improvements in regulating arrangements for horological movements comprising a spiral or balance spring of which the interior end is fixed to a split collet mounted on the arbor of a balance, one of the bearings of said arbor being carried by an end-piece fixed to the flat part of a cock. The invention is characterized in that an eccentric opening traverses the end-piece and the cock, the collet slit being accessible through said opening.

One form of the invention is shown in the drawing in plan. The drawing shows a balance 1 subjected to an alternate isochronous rotary movement maintained by a lever or pallets (not shown) and regulated by a spiral or balance spring 2 of which the interior end is conventionally fixed to a collet mounted on the balance arbor. The exterior end of spring 2 is fixed to a stud 4 which by means of a screw 5 is pinned in an ear 6 integral with an element of the frame 7 that constitutes the cock of the movement. A metal disk 8 that consitutes the end-piece and carries a bearing 9 for the balance arbor 1 is fixed to the end of the cock 7 by two screws (not shown). The end-piece 8 presents a lateral conical face directed upwards and guides an annular portion of a usual regulation 10 which is pivotable about the end-piece and permits of a fine regulation of the active length of spring 2. Between bearing 9 and the edge of end-piece 8 extends an opening 11 in the form of a circular arc which has a length approximately equal to one fourth of the end-piece circumference, or in other words its extent is approximately 90°. This opening is sufficiently large for the engagement of a special tool comprising a slender and narrow blade, and traverses the end-piece 8 and the flat cock part 7.

The orientation of opening 11 is such that a radial slit 12, which permits collet 3 to elastically pinch or clamp the arbor of balance 1, is visible through the opening.

As known, it is necessary, after having put in place the balance and secured the spiral, for setting spring 2 to the mark, to alter the collet orientation with respect to the balance until the position of the latter at dead point is correct.

In the arrangement described, such latter operation may be carried out without demounting the device, as it suffices to block the balance by fixing its rim and introduce the special tool mentioned above into opening 11 to reach slit 12, whereby collet 3 may be shifted as desired on the balance arbor.

We claim:
1. A regulating arrangement for horological movements comprising a balance, a cock having a stud projecting therefrom, an end-piece mounted on said cock and carrying a bearing for said balance, a collet movable with and adjustable with respect to said balance containing a slit adapted to receive a tool, a flat spiral balance spring having an inner end fixed to said collet and an outer end fixed to said stud, said end-piece and said cock containing eccentric openings in registry with one another and with said collet slit whereby a tool is insertable into said slit for adjusting said spring.

2. An arrangement as set out in claim 1 in which said end-piece opening has the form of a circular arc centered on the axis of the balance.

3. An arrangement as set out in claim 2 in which said arc is approximately 90°.

References Cited by the Examiner

UNITED STATES PATENTS

| 2,088,421 | 7/1937 | Kohlhagen | 58—109 |
| 2,380,292 | 7/1945 | Campau | 58—109 |
| 2,482,351 | 9/1949 | Line | 58—109 |

FOREIGN PATENTS

| 9,827 | 4/1903 | Great Britain. |
| 29,471 | 6/1904 | Switzerland. |

LEO SMILOW, Primary Examiner.